US 6,591,014 B1

(12) United States Patent
Ueda

(10) Patent No.: US 6,591,014 B1
(45) Date of Patent: Jul. 8, 2003

(54) APPARATUS FOR CODING MOVING PICTURE

(75) Inventor: Hiroaki Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/352,319

(22) Filed: Jul. 12, 1999

(30) Foreign Application Priority Data

Jul. 13, 1998 (JP) .......................................... 10-197500

(51) Int. Cl.⁷ ................................................ G06K 9/36
(52) U.S. Cl. ...................................... 382/236; 382/238
(58) Field of Search ................................. 382/236, 238; 375/240.25, 240.03; 345/723; 348/390.1

(56) References Cited

U.S. PATENT DOCUMENTS

| | | | | |
|---|---|---|---|---|
| 5,410,354 A | * | 4/1995 | Uz | ................................ 348/426 |
| 5,661,523 A | * | 8/1997 | Yamane | ....................... 348/390 |
| 5,758,092 A | * | 5/1998 | Agarwal | ................. 395/200.77 |
| 5,894,526 A | * | 4/1999 | Watanabe et al. | ........... 382/236 |
| 5,988,863 A | * | 11/1999 | Demos | ................... 364/715.02 |
| 6,072,831 A | * | 6/2000 | Chen | ........................... 375/240 |
| 6,084,909 A | * | 7/2000 | Chiang et al. | ............... 375/240 |
| 6,285,361 B1 | * | 9/2001 | Brewer et al. | .............. 345/328 |
| 6,320,909 B1 | * | 11/2001 | Takabatake et al. | ... 375/240.25 |

FOREIGN PATENT DOCUMENTS

| | | | |
|---|---|---|---|
| JP | 05-260459 | 10/1993 | .......... H04N/7/133 |
| JP | 09-130787 | 5/1997 | ............ H04N/7/24 |
| JP | 09-168155 | 6/1997 | ............ H04N/7/32 |
| JP | 10-42295 | 2/1998 | ............ H04N/7/32 |
| JP | 10-70727 | 3/1998 | ............ H04N/7/32 |

\* cited by examiner

Primary Examiner—Anh Hong Do
(74) Attorney, Agent, or Firm—Foley & Lardner

(57) ABSTRACT

According to a first aspect of the present invention, there is provided an apparatus for coding a moving picture while coding a part of frames of the moving picture into intra-frames (I-pictures), a part of frames sandwiched between contiguous intra-frames into forward predictive frames (P-pictures), and frames sandwiched between a forward predictive frame and another forward predictive frame or an intra-frame into a bidirectionally predictive frames (B-pictures), comprising: a determining means for determining the number of B-pictures between a P-picture and another P-picture or an I-picture based on an output frame rate and a substantial frame rate which is defined as the number of pictures capable of being processed per unit time by the apparatus provided that only I-pictures and P-pictures are coded; and a coding means for coding the B-pictures by treating the B-pictures as frames with no differential data.

16 Claims, 12 Drawing Sheets

FIG.11

```
PSC     32bit   00000100(H)  ⎫
TR      10bit   1            ⎪
PCT     3bit    011          ⎪
VD      16bit   48000(D)     ⎪
FPFV    1bit    0            ⎪
FFC     3bit    001          ⎪
FPBV    1bit    0            ⎪
BFC     3bit    011          ⎪
EBP     1bit    0            ⎬  FIXED INDEPENDENT
                             ⎪  OF PICTURE SIZE
SSC     32bit   000001AF(H)  ⎪
QS      5bit    16(D)        ⎪
EBS     1bit    0            ⎪
                             ⎪
MBAI    1bit    1            ⎪
MBTYPE  4bit    0010         ⎪         MBTYPE
QS      5bit    0            ⎪         MBQUANT  1bit  0
MHF     1bit    0            ⎪         MBFV     1bit  1
MVF     1bit    0            ⎭         MBBV     1bit  0
                                       MBP      1bit  0
MB ESC  11bit   0000 0001 000 ⎫ NUMBER OF MB ESC VARY   MBINTRA  1bit  0
MB ESC  11bit   0000 0001 000 ⎭ ACCORDING TO PICTURE SIZE MBAI    4bit    13(D)        ⎫
MBTYPE  4bit    0010         ⎪
QS      5bit    0            ⎬  CODE OF MBAI VARY
MHF     1bit    0            ⎪  ACCORDING TO PICTURE SIZE
MVF     1bit    0            ⎭
```

| | | |
|---|---|---|
| PSC | :Picture Start Code | INDICATE FRAME HEAD |
| TR | :Temporal Reference | SUCCESSIVE NUMBER(RESET FOR EVERY GOP) |
| PCT | :Picture Coding Type | FRAME TYPE |
| VD | :VBV Delay | INITIAL STATE OF BUFFER AT THE TIME OF RANDOM ACCESS |
| FPFV | :Full Pel Forward Vector | ACCURACY OF FORWARD MOTION VECTOR(FULL PEL/HALF PEL) |
| FFC | :Forward f Code | DESCRIPTION RANGE OF FORWARD MOTION VECTOR |
| FPBV | :Full Pel Backward Vector | ACCURACY OF BACKWARD MOTION VECTOR(FULL PEL/HALF PEL) |
| BFC | :Backward f Code | DESCRIPTION RANGE OF BACKWARD MOTION VECTOR |
| EBP | :Extra Bit Picture | BIT INDICATIVE OF PRESENCE/ABSENCE OF INFORMATION FOR EXTENSION |
| SSC | :Slice Start Code | INDICATE SLICE HEAD |
| QS | :Quantizer Scale | VALUE FOR USE IN QUANTIZATION |
| EBS | :Extra Bit Slice | BIT INDICATIVE OF PRESENCE/ABSENCE OF INFORMATION FOR EXTENSION |
| MBAI | :Macroblock Address Increment | INDICATE NUMBER OF MACRO-BLOCKS(MBs)SKIPPED PREVIOUSLY |
| MBTYPE | :Macroblock Type | INDICATE CODING TYPE OF MB |
| MHF | :Motion Horizontal Forward Code Motion Horizontal Forward r | INDICATE DIFFERENCE OF HOROZONTAL COMPONENT OF FORWARD MOTION VECTOR BETWEEN CURRENT MB AND PREVIOUS MB |
| MVF | :Motion Vertical Forward Code Motion Vertical Backward r | INDICATE DIFFERENCE OF VERTICAL COMPONENT OF FORWARD MOTION VECTOR BETWEEN CURRENT MB AND PREVIOUS MB |
| MB ESC | :Macroblock Escape | CORRESPOND TO SKIPPING 33 MBs |

TIME

APPARATUS FOR CODING MOVING PICTURE

BACKGROUND OF THE INVENTION

1. Field of the Invention

The present invention relates to an apparatus for coding moving picture, and more particularly, to an apparatus for coding moving picture, in which a part of frames of the moving picture is coded into intra-frames (I-pictures), a part of frames sandwiched between contiguous intra-frames is coded into forward predictive frames (P-pictures), and frames sandwiched between a forward predictive frame and another forward predictive frame or an intra-frame is coded into a bidirectionally predictive frames (B-pictures).

2. Description of the Prior Art

Picture data has an enormous data amount and thus is normally coded into compressed digital data in order to be recorded in a record medium such as a CD-ROM and a hard disk. Such the compressive coding methods include various types. In particular, a coding method that compresses on the basis of DCT (Discrete Cosine Transform), which uses a characteristic of spatial frequencies that concentrate in low frequencies, is employed relatively wider. DCT is employed in International Standard coding methods such as JPEG (Joint Photographic Coding Experts Group), MPEG (Moving Picture Coding Experts Group) 1 and 2.

A frame rate (the number of frames per unit time) is determined in a moving picture coding method of a storage type as represented by MPEG1. Even a moving picture coding apparatus with a low compression performance, therefore, is not allowed to reduce a frame rate in order to compress a picture in real time.

A method for reducing a substantial frame rate while complying with the standard of MPEG 1 is disclosed in JPA 10-42295. The method reduce a substantial frame rate by omitting practical compression process for a part of inter-frame pictures (P-pictures and B-pictures) while generating codes indicating that the pictures has no difference.

A period for generating the codes indicating that the pictures has no difference, however, does not always match with the substantial frame rate of the moving picture coding apparatus. Thus, there is a disadvantage that the moving picture can not be compressed at a high efficiency without wasting a performance of the moving picture coding apparatus.

JPA 10-70727 solves a delay that occurs on transmission of compressed video information by deleting B-blocks.

The delay of transmission, however, is not always proportional to the compressive performance. Thus, there is also a disadvantage that the moving picture can not be compressed at a high efficiency without wasting a performance of the moving picture coding apparatus.

JPA 9-130787 adjusts a frame rate by determining frames to skip in accordance with a practical code amount.

The code amount, however, is not always proportional to the compressive performance. Thus, there is still a disadvantage that the moving picture can not be compressed at a high efficiency without wasting a performance of the moving picture coding apparatus.

SUMMARY OF THE INVENTION

In order to overcome the aforementioned disadvantages, the present invention has been made and accordingly, has an object to provide an apparatus for coding moving picture capable of compressing a moving picture at a high efficiency without wasting a performance of the apparatus.

According to a first aspect of the present invention, there is provided an apparatus for coding a moving picture while coding a part of frames of the moving picture into intra-frames (I-pictures), a part of frames sandwiched between contiguous intra-frames into forward predictive frames (P-pictures), and frames sandwiched between a forward predictive frame and another forward predictive frame or an intra-frame into a bidirectionally predictive frames (B-pictures), comprising: a determining means for determining the number of B-pictures between a P-picture and another P-picture or an I-picture based on an output frame rate and a substantial frame rate which is defined as the number of pictures capable of being processed per unit time by the apparatus provided that only I-pictures and P-pictures are coded; and a coding means for coding the B-pictures by treating the B-pictures as frames with no differential data.

In the apparatus for coding moving picture, the coding means may generate for each of the B-pictures a code sequence determined on the basis of a frame size of the moving picture.

In the apparatus for coding moving picture, the determining means may determine the number of the B-pictures so that the apparatus operates at the maximum performance ability.

In the apparatus for coding moving picture, the determining means may determine the number of the B-pictures so that the number of the B-pictures distributes as uniformly as possible.

The apparatus for coding moving picture may further comprise: a means for selecting an output frame rate from a plurality of predetermined output frame rates so as to minimize the least common multiple between the substantial frame rate and the selected output frame rate.

The apparatus for coding moving picture may further comprise: a means for computing and updating the substantial frame rate on the basis of the number of frames compressed since the most recent updating of the substantial frame rate, a current output frame rate, the number of the B-pictures interpolated since the most recent updating of the substantial frame rate, and a total time waiting for capture of I-pictures and P-pictures since the most recent updating of the substantial frame rate.

According to a second aspect of the present invention, there is provided a method for coding a moving picture while coding a part of frames of the moving picture into intra-frames (I-pictures), a part of frames sandwiched between contiguous intra-frames into forward predictive frames (P-pictures), and frames sandwiched between a forward predictive frame and another forward predictive frame or an intra-frame into a bidirectionally predictive frames (B-pictures), comprising: a determining step of determining the number of B-pictures between a P-picture and another P-picture or an I-picture based on an output frame rate and a substantial frame rate which is defined as the number of pictures capable of being processed per unit time by the apparatus provided that only I-pictures and P-pictures are coded; and a coding step of coding the B-pictures by treating the B-pictures as frames with no differential data.

In the method for coding moving picture, at the coding step, a code sequence determined on the basis of a frame size of the moving picture is generated for each of the B-pictures.

In the method for coding moving picture, at the determining step, the number of the B-pictures is determined so that the apparatus operates at the maximum performance ability.

In the method for coding moving picture, at the determining step, the number of the B-pictures is determined so that the number of the B-pictures distributes as uniformly as possible.

The method for coding moving picture may further comprise: a step of selecting an output frame rate from a plurality of predetermined output frame rates so as to minimize the least common multiple between the substantial frame rate and the selected output frame rate.

The method for coding moving picture may further comprise: a step of computing and updating the substantial frame rate on the basis of the number of frames compressed since the most recent updating of the substantial frame rate, a current output frame rate, the number of the B-pictures interpolated since the most recent updating of the substantial frame rate, and a total time waiting for capture of I-pictures and P-pictures since the most recent updating of the substantial frame rate.

Other features and advantages of the invention will be apparent from the following description of the preferred embodiments thereof.

BRIEF DESCRIPTION OF THE DRAWINGS

The present invention will be more fully understood from the following detailed explanation with reference to the accompanying drawings in which:

FIG. 11 is a diagram exemplifying a code sequence of a B-picture with no differential data;

DETAILED DESCRIPTION OF THE PREFERRED EMBODIMENTS

The present invention enables an apparatus for coding moving picture to perform compressive coding in real time even if a compressive performance thereof is low. According to the present invention, a substantial frame rate that is a operatable cycle of the apparatus can be reduced by interpolating a code which indicates that a part of frames has no difference.

Figure 1:
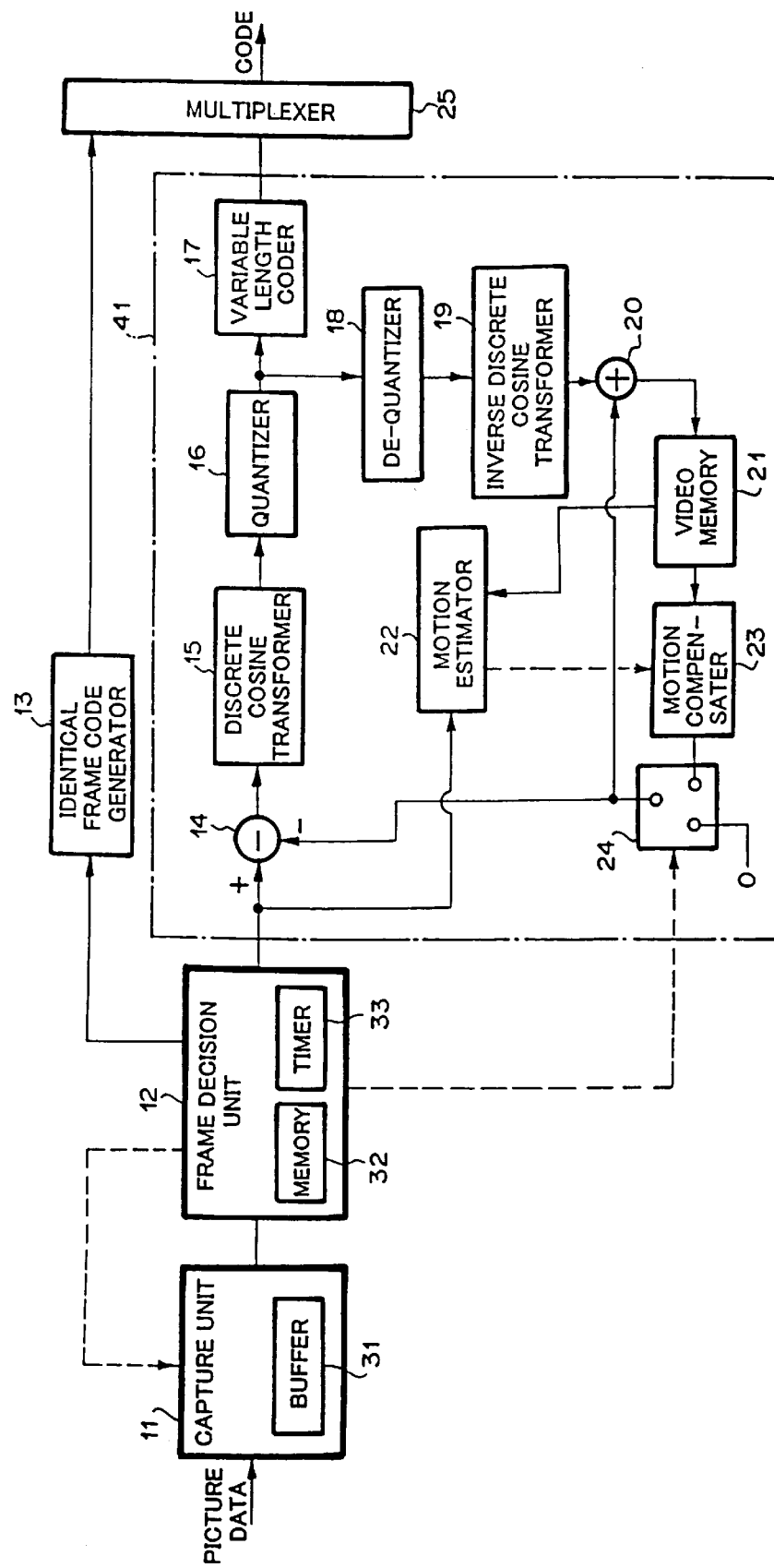
FIG. 1 is a block diagram showing an arrangement of an apparatus for coding moving picture according to an embodiment of the present invention.

FIG. 1 is a block diagram showing an arrangement of an apparatus for coding moving picture according to an embodiment of the present invention.

Referring to FIG. 1, capture unit 11 captures a picture every frame. Frame decision unit 12 obtains a GOP configuration optimal for a substantial frame rate predicted from a compression performance and picture size, and decides a picture type of a current frame based on the configuration. Coder 41 performs compression in case of I-pictures and P-pictures, but does not perform compression in case of B-pictures practically. Instead, identical frame code generator 13 interpolates a code indicative of a frame with no difference. Multiplexer 25 multiplexes a code output from coder 41 with a code generated from identical frame code generator 13. Frame decision unit 12 also examines, when having processed a certain number of frames, a total time waiting for the capture from capture unit 11, the number of B-picture frames and the like. Based on the examined values, frame decision unit 12 further re-computes the substantial frame rate and updates the GOP configuration to be optimal based on the re-computed frame rate.

A format of compressing standard such as MPEG1 in which the number of frames per unit time is defined will be explained with reference to FIGS. 12 and 13.

Figure 12:
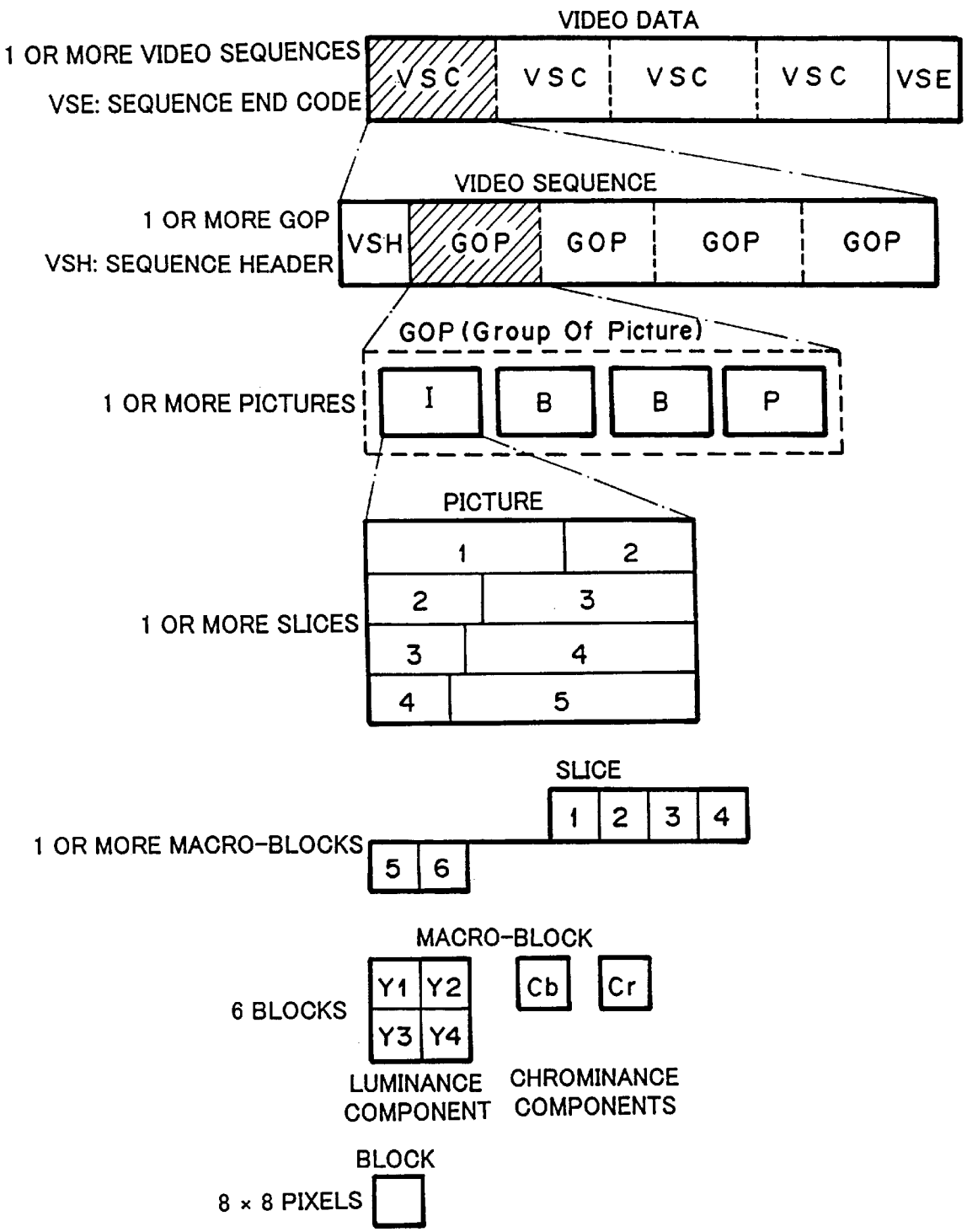
FIG. 12 is a diagram showing a hierarchy of codes in MPEG format.

FIG. 12 is a diagram showing a hierarchy of a code format based on MPEG1 video. MPEG1 video codes have a hierarchical structure consisting of several hierarchies as shown in FIG. 12. Video data includes one or more video sequences (VSCs) and terminates with a video sequence end code (VSE). A video sequence includes a video sequence header (VSH) and one or more GOPs (Group Of Pictures). A GOP includes one or more pictures, each of which indicates one frame. The pictures are classified into three types: an I-picture consisting of intra-frame codes; a P-picture consisting of forward inter-frame codes; and a B-picture consisting of forward and backward, or bidirectional, inter-frame codes. A picture includes plural slices divided into free regions. A slice includes plural macro-blocks arranged in an order of from left to right and from upside to downside. The macro-blocks are generally classified into two types: an intra-block including intra-frame codes; and an inter-block including the forward inter-frame codes or bidirectional inter-frame codes. An I-picture includes only intra-blocks. A P-picture and a B-picture include not only inter-blocks but also intra-blocks. A macro-block includes four luminance component blocks (Y1, Y2, Y3 and Y4), each having 8×8 pixels, which are obtained by dividing a block of 16×16 pixels. The macro-block also includes chrominance component blocks (Cb and Cr), each having an area of 8×8 pixels, which are coincident with 16×16 pixels of the luminance component. One macro-block includes six blocks in total accordingly: four luminance component blocks and two chrominance component blocks. The block of 8×8 pixels (hereinafter, occasionally referred to as a micro-block) is the minimum unit for coding.

Figure 13:
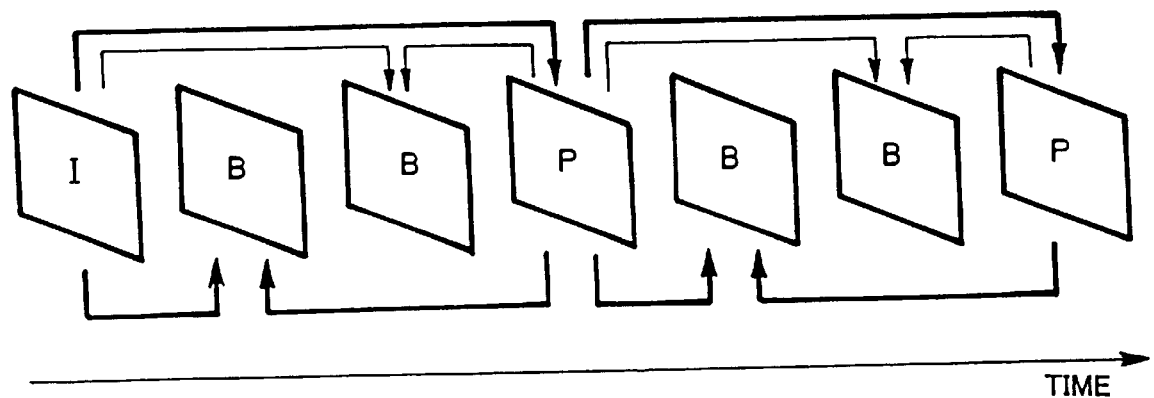
FIG. 13 is a diagram showing reference relation among pictures in a GOP.

FIG. 13 is a diagram showing a GOP configuration of MPEG1. Frame types include I, P and B. I-picture is a frame compressed without using any reference frame. P-picture is a frame compressed with reference to a preceding I- or P-picture. B-picture is a frame compressed with reference to preceding and succeeding I- or P-pictures. B-picture itself is not referred to as a reference frame. As the number of frames per unit time is defined in MPEG1, there is no frame which is not subjected to compression. However, if data of B-picture is treated as same as that of the reference frame, the load on the compression process can be extremely reduced, and the same effects as those in a case of without the compression process can be obtained accordingly.

FIG. 1 is an arrangement diagram of an apparatus for coding moving picture according to an embodiment of the present invention. Referring to FIG. 1, the moving picture coding apparatus includes the following units in this embodiment. Capture unit 11 captures an original picture. Buffer 31 is contained in capture unit 11 and temporarily stores the frames captured by capture unit 11. Frame decision unit 12 decides picture types of frames to process based on a GOP configuration in accordance with a compression performance. Memory 32 is contained in frame decision unit 12 and stores control variables and the like for use in frame decision unit 12. Timer 33 is contained in frame decision unit 12 and measures a time waiting for a capture. Motion estimator 22 estimates picture motions on a macro-block basis. Discrete cosine tranformer 15 transforms a picture block of 8×8 pixels into spatial frequency components. Quantizer 16 quantizes the spatial frequency components. De-quantizer 18 de-quantizes the quantized spatial frequency components. Inverse discrete cosine tranformer 19 inversely converts the de-quantized spatial frequency components. Motion compensater 23 compensates picture motions of the reference frame on a macro-block basis. Variable length coder 17 performs variable-length coding of the quantized spatial frequency components. Multiplexer 25 multiplexes codes output from variable length coder 17 with codes generated from identical frame code generator 13.

Each unit of the above moving picture coding apparatus operates as follows:

Capture unit 11 fetches from buffer 31 picture of a frame designated from frame decision unit 12. Frame decision unit 12 decides the picture type of a current frame being input on a frame-by-frame basis based on the GOP configuration optimal for the substantial frame rate predicted from the compression performance and picture size. Coder 41 compresses I-pictures and P-pictures in accordance with the picture types.

When the current frame is an I-picture, the picture data output from frame decision unit 12 is converted at discrete cosine tranformer 15 into spatial frequency components on every 8×8 pixels. The spatial frequency components are quantized by quantizer 16 and the quantized spatial frequency components are further variable-length coded at variable length coder 17. The variable codes output from the variable length coder 17 are fed to multiplexer 25 at which it is multiplexed with the picture type and the like output from frame decision unit 12. The quantized spatial frequency components are de-quantized at de-quantizer 18. The de-quantized spatial frequency components of 8×8 pixel-block are inversely converted into spatial position components at inverse discrete cosine tranformer 19 and then is written into video memory 21.

When the current frame is a P-picture, the macro-block in the reference frame which is stored in video memory 21 and has the highest correlation with a current macro-block output from frame decision unit 12 is found at motion estimator 22. The macro-block with the highest correlation is output from motion compensater 23 and then is output through switch 24. At subtracter 14, each pixel data in the block of 8×8 pixels within the macro-block with the highest correlation that passed through switch 24 is subtracted from each pixel data in the block of 8×8 pixels of the current frame that is output from frame decision unit 12. The output from subtracter 14 is converted into spatial frequency components at discrete cosine tranformer 15. The spatial frequency components are quantized by quantizer 16 and the quantized spatial frequency components are further variable-length coded at variable length coder 17. The variable codes output from variable length coder 17 is fed to multiplexer 25 at which the coes are multiplexed with a code sequence such as the picture type and the like output from frame decision unit 12. The quantized spatial frequency components are de-quantized at de-quantizer 18. The de-quantized spatial frequency components of 8×8 pixel-block are inversely converted into each pixel data at inverse discrete cosine tranformer 19. The output from switch 24 is added with each pixel data at adder 20 and the output from adder 20 is written to video memory 21.

When the current frame is a B-picture, a code indicative of a frame with no difference is interpolated instead of executing a practical compression. That is, if frame decision unit 12 decides that the current frame is a B-picture, identical frame code generator 13 outputs the code sequence indicative of a frame with no difference to multiplexer 25, which in turn selects this code sequence. Frame decision unit 12 also obtains, when having processed a certain number of frames, a total time waiting for capture which has been measured at timer 33. Based on the obtained value of time, frame decision unit 12 further re-computes the substantial frame rate and optimizes and updates the GOP configuration so that the substantial frame rate meets with the output frame rate.

The entire operations of this embodiment will be detailed with reference to a flowchart of FIG. 2.

Frame decision unit 12 performs a frame rate process (step S101) to be described later, and then decides the picture type of the current frame (step S102).

When the current frame is an I-picture, picture data of the current frame is read from buffer 31 of capture unit 11 (step S111). A micro-block of the picture data is converted into spatial frequency components by discrete cosine tranformer 15 (step S112). The spatial frequency components are quantized by quantizer 16 (step S113), and the quantized spatial frequency components are further variable-length coded at variable length coder 17 (step S114). The quantized spatial frequency components are de-quantized at de-quantizer 18 (step S115). Each pixel data is approximately restored from the de-quantized spatial frequency components at inverse discrete cosine tranformer 19 (step S116). Each restored pixel data is written to video memory 21 as each pixel data of the reference frame (step S117). Steps 112 through 117 are executed for all micro-blocks in all macro-blocks of the current frame (steps S118, S19).

When the current frame is a P-picture, picture data of the current frame is read out from buffer 31 of capture unit 11 (step S131). The macro-block of the reference frame which has the minimum difference from the macro-block of the current frame is found by motion estimator 22 (step S132). The pixel data of the found macro-block of the reference frame is subtracted from the pixel data of the macro-block of the current frame by subtracter 14 on a micro-block basis (step S133). The difference output from subtracter 14 is converted into spatial frequency components on a micro-block basis by discrete cosine tranformer 15 (step S134). The spatial frequency components are quantized by quantizer 16 (step S135), and the quantized spatial frequency components are further variable-length coded at variable length coder 17 (step S136). The quantized spatial frequency components are de-quantized at de-quantizer 18 (step S137). The difference is approximately restored from the de-quantized spatial frequency components at inverse discrete cosine tranformer 19 (step S138). The data of the reference frame is added with the restored difference at adder 20 (step S139). The sum output from adder 20 is written into video memory 21 as pixel data of the reference frame (step S140). Steps 130 through 140 are executed for all micro-blocks in the current macro-block (step S141) and steps 132 through 141 are executed for all macro-blocks of the current frame (step S142).

When the current frame is a B-picture, identical frame code generator 13 generates the code indicative of a frame with no difference (step S151).

At step S161 following to step S119, step S142 or step S151, the generated codes are output through multiplexer 25. At step S162 subsequent to step S161, it is determined whether all frames within GOP are finished. If the determined result is negative, the process returns to step S101. Otherwise, the process is terminated.

Figure 2:
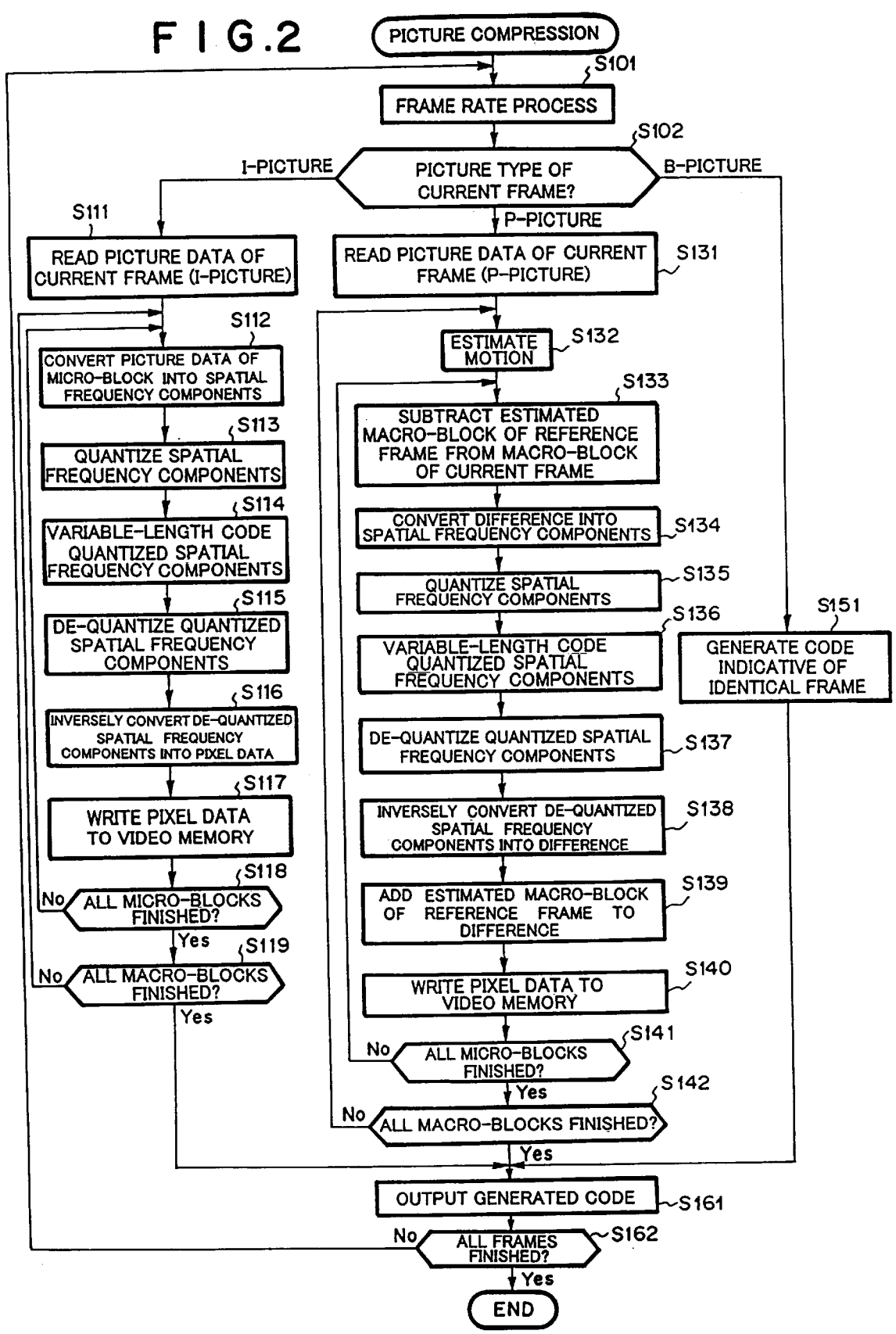
FIG. 2 is a flowchart showing operations of the apparatus for coding moving picture according to the embodiment of the present invention.
Figure 3:
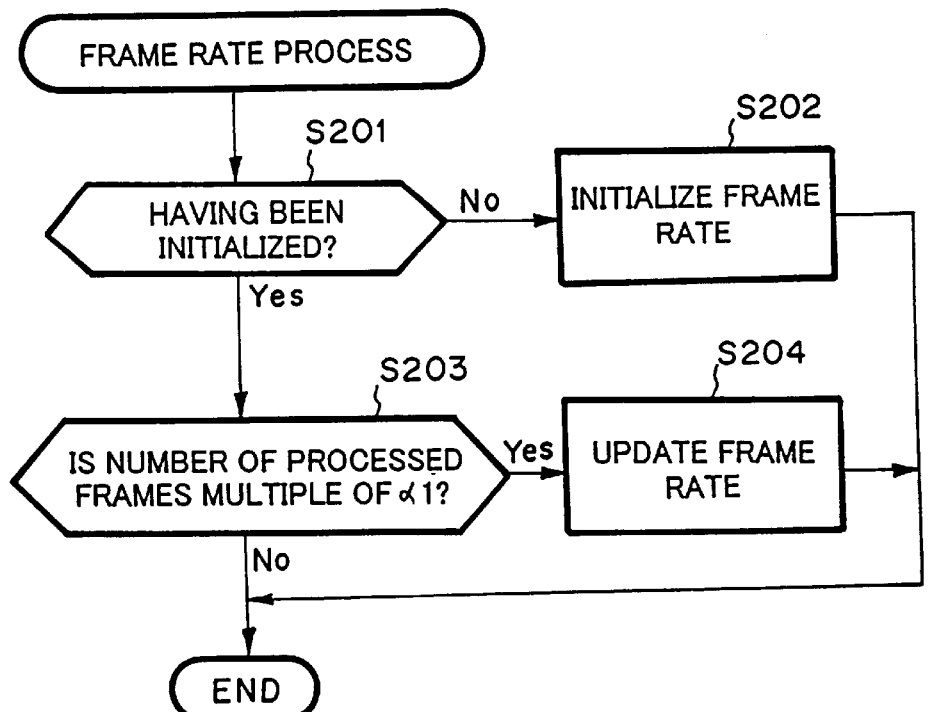
FIG. 3 is a flowchart illustrating details of a frame rate process in FIG. 2.

FIG. 3 is a detailed flowchart of a frame rate process performed by frame decision unit 12 (step S101 in FIG. 2). Referring to FIG. 3, it is determined whether the substantial frame rate is initialized (step S201). If the determined result is negative, the substantial frame rate is initialize (step S202). Otherwise, it is determined whether the number of processed frames is equal to a multiple of $\alpha 1$ (step S203). If the determined result is affirmative, the substantial frame rate is updated (step S204). The value of $\alpha 1$ herein is different on every moving picture coding apparatus, and the unit of $\alpha 1$ is normally a GOP or a sequence.

Figure 4:
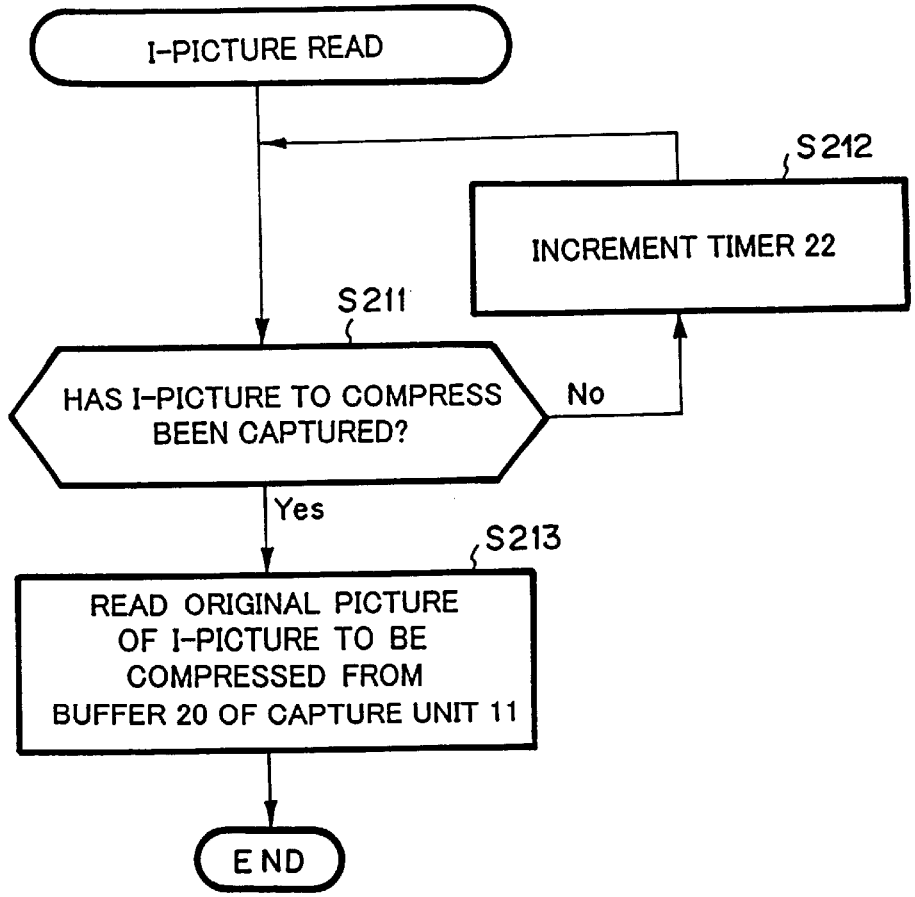
FIG. 4 is a flowchart illustrating details of reading an I-picture in FIG. 2.

FIG. 4 is a detailed flowchart of a reading process of pixel data from a current frame (step S111 in FIG. 2) performed by frame decision unit 12 when the current frame is an I-picture. Referring to FIG. 4, it is determined whether the I-picture to compress is already captured (step S211). If the determined result is negative, timer 33 is incremented (step S212). If the determined result is affirmative, the original picture of the I-picture to be compressed is read from buffer 31 in capture unit 11 (step S213).

Figure 5:
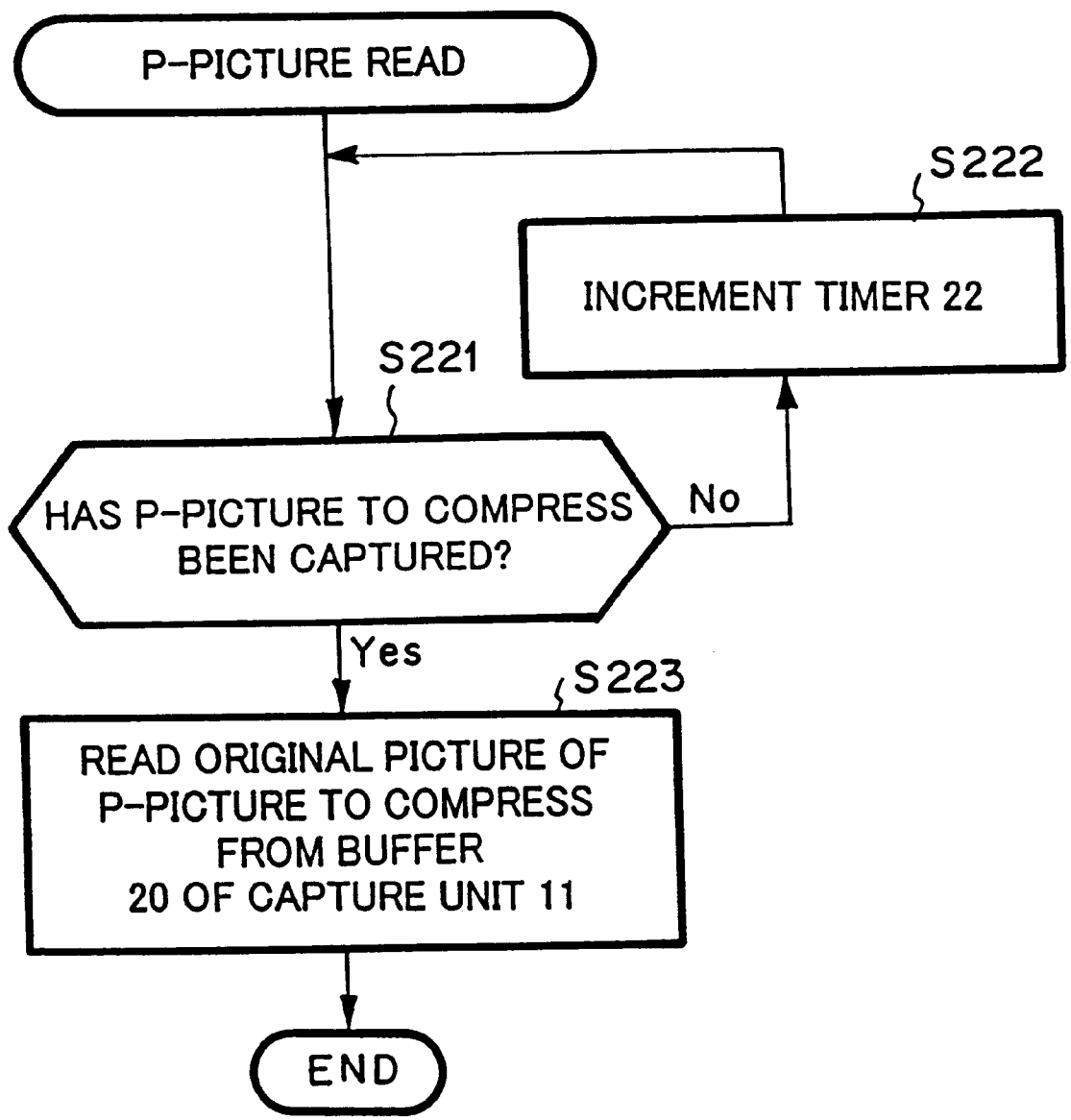
FIG. 5 is a flowchart illustrating details of reading a P-picture in FIG. 2.

FIG. 5 is a detailed flowchart of a reading process of pixel data from a current frame (step S131 in FIG. 2) performed by frame decision unit 12 when the current frame is a P-picture. Referring to FIG. 5, it is determined whether the P-picture to compress is already captured (step S221). If the determined result is negative, timer 33 is incremented (step S222). If the determined result is affirmative, the original picture of the P-picture to be compressed is read from buffer 31 in capture unit 11 (step S223).

Figure 6:
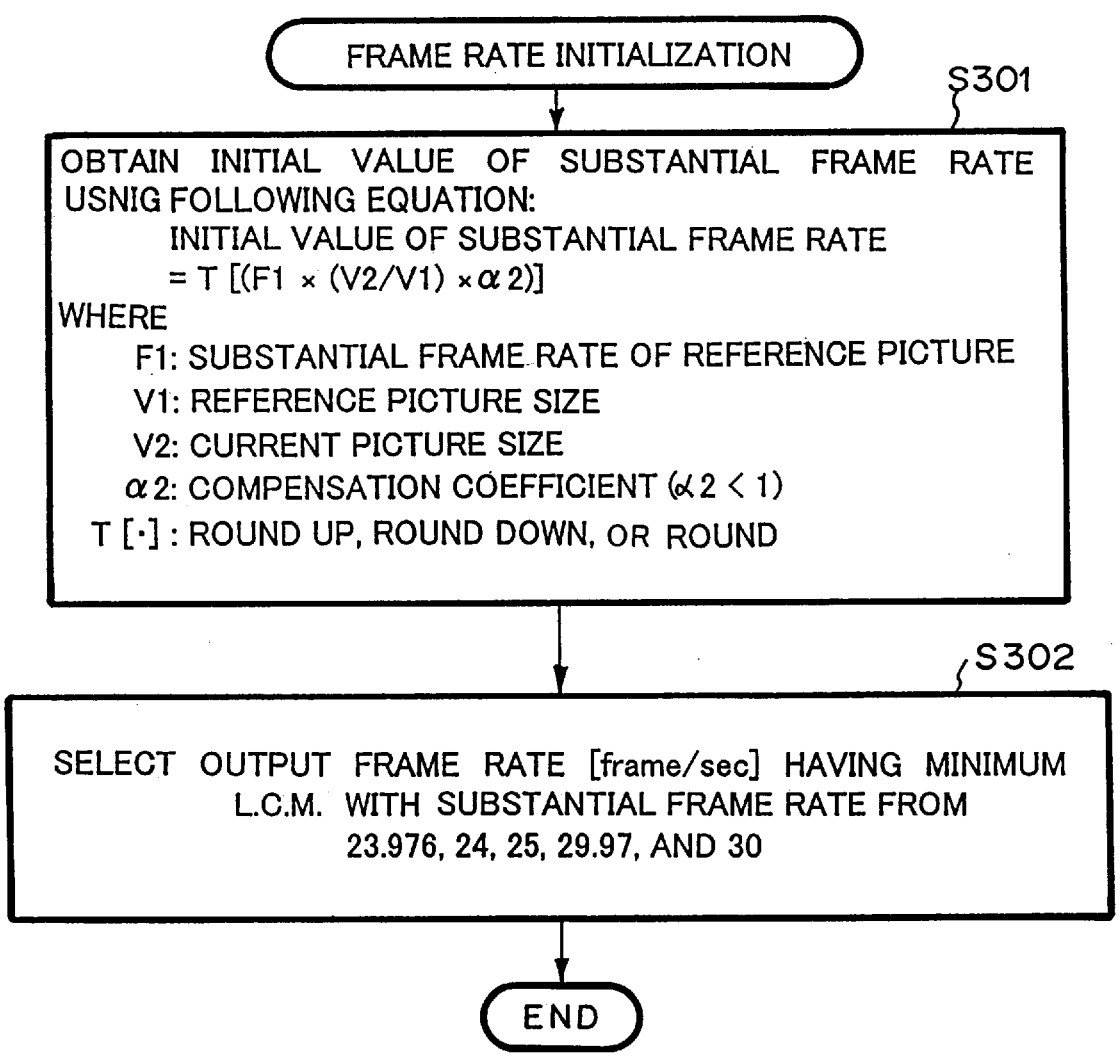
FIG. 6 is a flowchart illustrating details of initializing a frame rate in FIG. 3.
Figure 7:
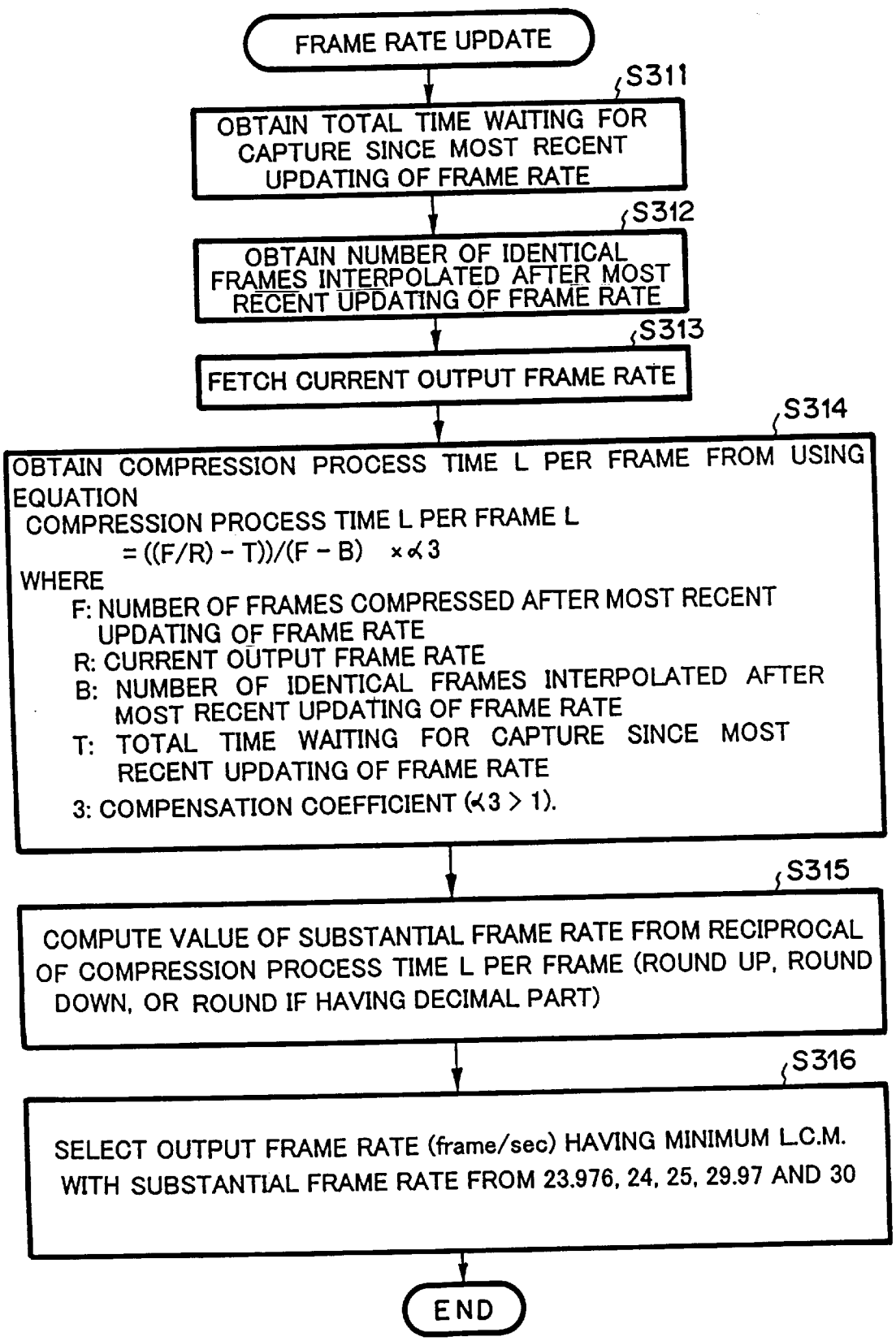
FIG. 7 is a flowchart illustrating details of updating a frame rate in FIG. 3.

FIG. 6 is a detailed flowchart of the initialization process of the frame rate in FIG. 3 (step S202) and FIG. 7 is a detailed flowchart of the update process of the frame rate in FIG. 3 (step S204).

The initialization process of the frame rate will be explained with reference to FIG. 6.

First, an initial value of a substantial frame rate is obtained by using the following equation (step S301).

An initial value of a substantial frame rate $$=T[(F1\times(V2/V1)\times\alpha 2)],$$

where
F1: a substantial frame rate of a reference picture;
V1: a reference picture size;
V2: a current picture size; and
$\alpha 2$: a compensation coefficient ($\alpha 2<1$).

T[ ] stands for rounding up, rounding down, or rounding. The coefficient of $\alpha 2$ is a coefficient for giving a margin to the compression process, which is different from apparatus to apparatus. The reference picture size and reference picture is determined so that the substantial frame rate becomes the reference frame rate.

In a case where, for example:
F1=12.2;
V1=176×144=25344;
V2=320×240=76800; and
2=0.8,
and T [·] stands for rounding down, the initial value of the substantial frame rate becomes:

$$T[(12.2\times(76800/25344)\times 0.8)]=T[29.57]=29.$$

Next, an output frame rate having the minimum L.C.M. (the least common multiple) with the substantial frame rate is selected (step S302). This output frame rate [frame/sec] is selected from values of 23.976, 24, 25, 29.97, and 30. The output frame rate becomes 24 if the substantial frame rate is 8 for example. The output frame rate may also be fixed at 24 that have the maximum number of divisors in order to simplify the process.

The update process of the frame rate will be explained with reference to FIG. 7.

The total time waiting for capture since the most recent updating of the frame rate is obtained (step S311). The number of interpolated frames with no differences (B-pictures) since the most recent updating of the frame rate is obtained (step S312). Then, the current output frame rate is obtained (step S313), and a compression process time L per frame is obtained by using the following equation (step S314):

Compression process time L per frame $$=((F/R)-T))/(F-B)\times\Delta 3,$$

where
F: the number of frames compressed since the most recent updating of the substantial frame rate;
R: the current output frame rate;
B: the number of interpolated frames with no differences (B-pictures) since the most recent updating of the substantial frame rate;
T: the total time waiting for capture since the most recent updating of the frame rate; and.
$\alpha 3$: a compensation coefficient ($\alpha 3>1$).

The coefficient of $\alpha 3$ is a coefficient for giving a margin to the compression process, which is different from apparatus to apparatus. The compression process time is assumed identical for I-pictures and for P-pictures, which, however, causes no problem because the number of P-pictures is greater than that of I-pictures.

In a case where, for example:
F=49 [frame];
R=24 [frame/sec];
B=25 [frame];
T=160 [msec]; and
3=1.05,
compression process time L per frame becomes:

$$(49/24-160/1000)/(49-25)\times 1.05=82.32 [\text{msec/frame}].$$

Next, a value of the substantial frame rate is calculated as the reciprocal of compression process time L per frame, and the value of the substantial frame rate is rounding up, rounded down, or rounded if it includes a decimal part(step S315). In a case where, for example:

L=82.32 [msec/frame], the updated substantial frame rate becomes 12 [frame/sec] by rounding off the decimal part of:

1000/82.32 [frame/sec].

an output frame rate having the minimum L.C.M (the least common multiple) with the substantial frame rate is selected (step S316). This output frame rate [frame/sec] is selected from values of 23.976, 24, 25, 29.97, and 30. The output frame rate becomes 24 if the substantial frame rate is 8 for example. The output frame rate may also be fixed at 24 that have the maximum number of divisors in order to simplify the process.

Figure 8:
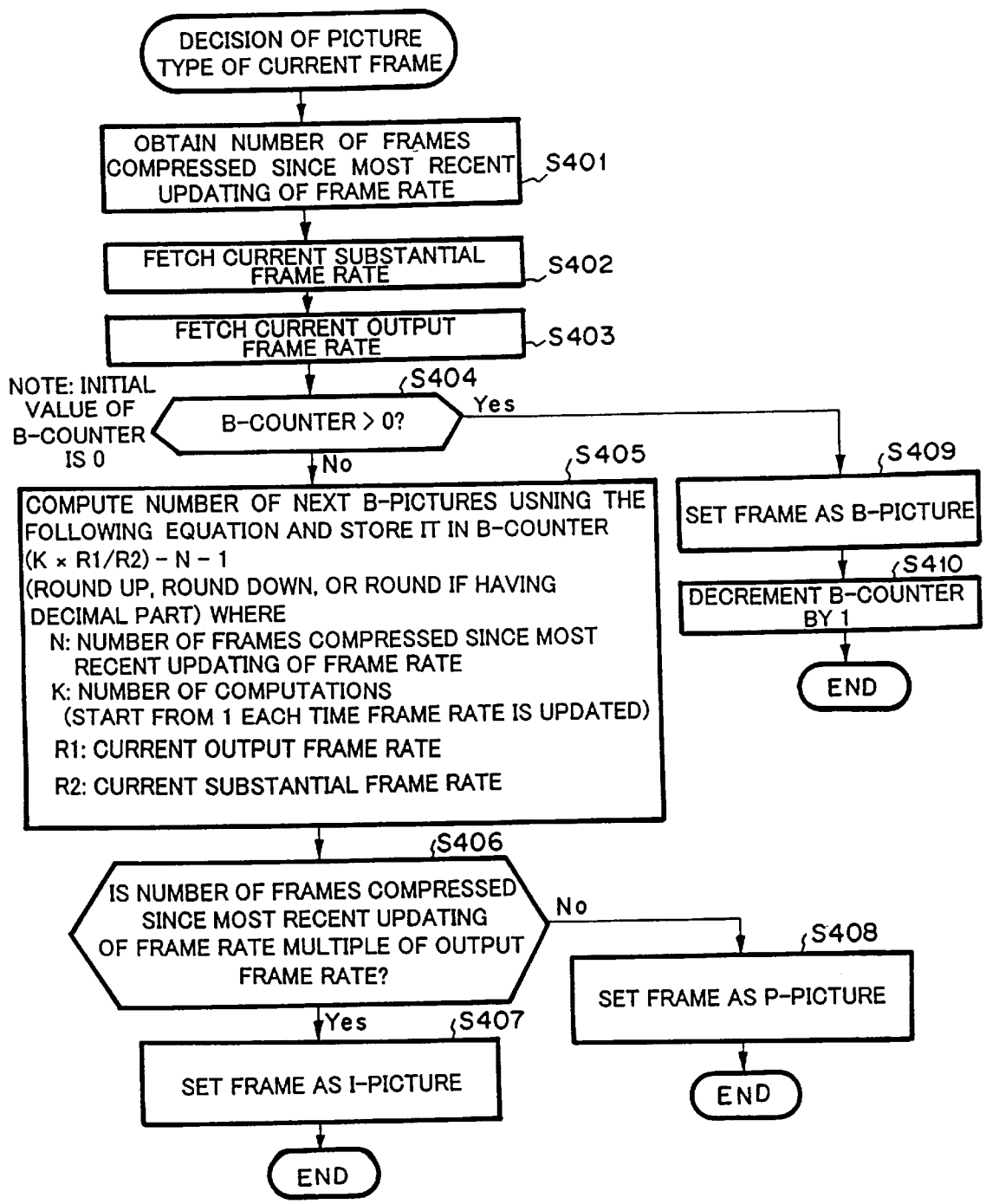
FIG. 8 is a flowchart illustrating details of determining a picture type for a current frame of FIG. 2.

FIG. 8 is a flowchart of the process for decision of picture types (step S102 in FIG. 2). In FIG. 8, the number of frames compressed since the most recent updating of the substantial frame rate and the output frame rate is obtained (step S401). The current substantial frame rate is fetched (step S402). The current output frame rate is fetched(step S403). Next, it is determined whether a value of B-counter (whose initial value is equal to 0) stored in memory 32 is more than zero (step S404). If the determined result is negative, the number of frames of B-pictures to be interpolated between the present I-picture or P-picture and the next I-picture or P-picture is calculated by using the following equation and the number is store in B-counter (step S405):

The number of frames of B-pictures $$=T[(K \times R1/R2)-N-1],$$

where

N: the number of frames compressed since the most recent updating of the frame rate;

K: the number of computations of the number of frames of B-pictures (start from 1 each time the frame rate is updated);

R1: the current output frame rate; and

R2: the current substantial frame rate, and T [·] stands for rounding up, rounding down, or rounding.

In a case where, for example:

N=4;

K=3;

R1=24; and

R2=12, the number of frames of B-pictures to be interpolated between the current I-picture or P-picture and the next I-picture or P-picture becomes:

$$(3 \times 24/12)-4-1=1.$$

Next, it is determined whether the number of frames compressed since the most recent updating of the frame rate is a multiple of the output frame rate (step S406). If the determined result is affirmative, the type of the picture to be compressed is set to I-picture (step S407). If the determined result is negative, the type of the picture to be compressed is set to P-picture (step S408). Thus, an I-picture appears once a second. It is, therefore, possible to vary an I-picture rate by changing the decision criteria at step S406.

If it is determined that the value of B-counter is more than zero at step S404, the type of the picture to be compressed is set to B-picture (step S409) and B-counter is decremented by 1 (step S410).

An example will be explained below.

Figure 9:
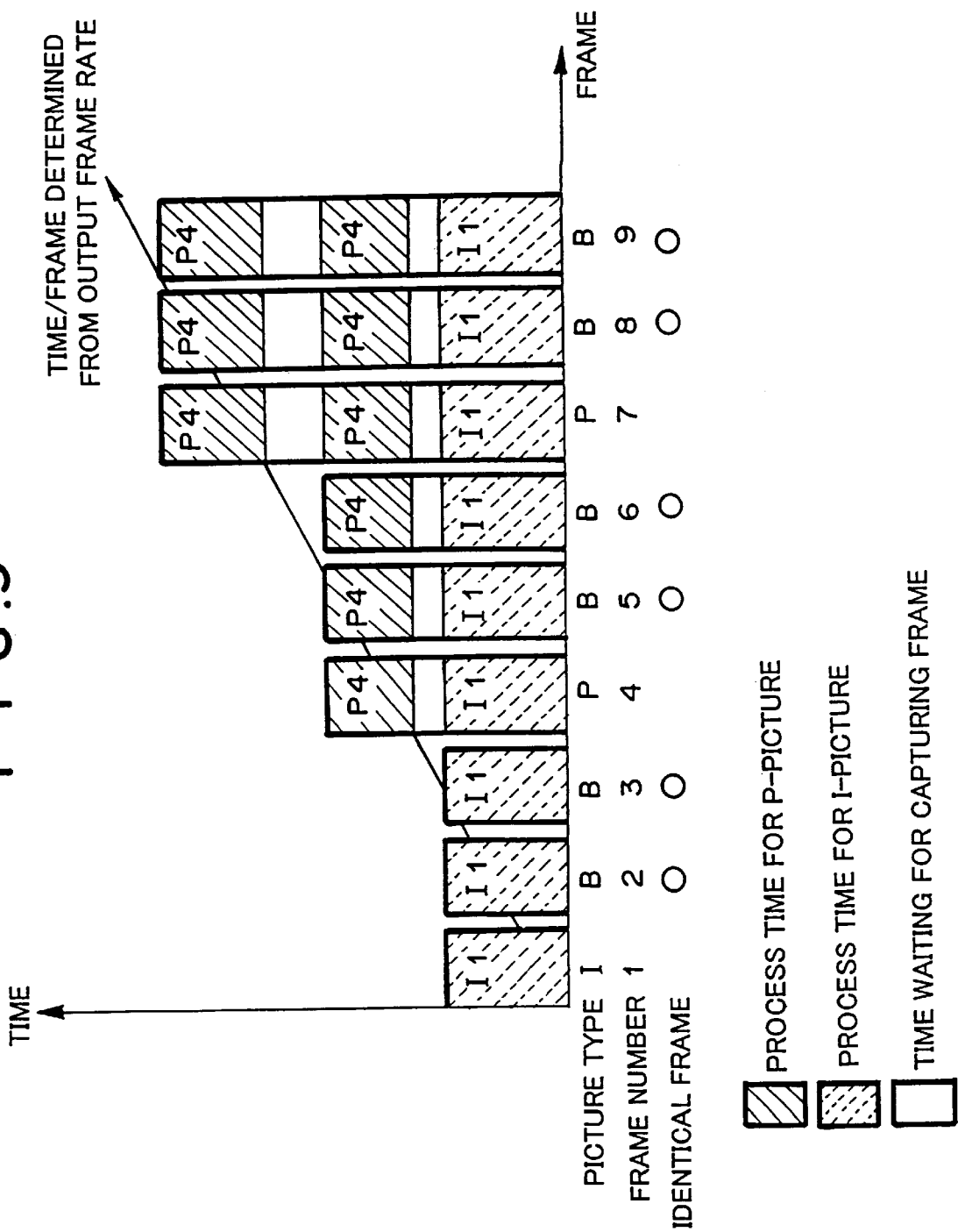
FIG. 9 is a diagram illustrating that it is possible to perform compression in real time by deleting a load needed for a B-picture process according to the embodiment of the present invention.

FIG. 9 is a diagram illustrating that compression can be performed in real time by deleting the load related to the B-picture process. Vertically stacked bars in FIG. 9 indicate the sum of the compression process time for the I-pictures and P-pictures. If the top of each bars indicating the sum of the compression process time of pictures is located below the straight line inclined upwardly to the right, which represents time/frame in connection with the output frame rate, a real time processing can be performed. The compression processes will be explained in the order of frame number.

First Frame:

Start I-picture compression because the first frame is an I-picture.

Second Frame:

Continue the I-picture compression because the I-picture compression has not been completed yet although B-picture compression should be started originally.

Third Frame:

Still continue I-picture compression because the I-picture compression has not been completed yet although B-picture compression should be started originally. Generate the code indicative of the frame with no difference after completion of the I-picture compression instead of compressing two B-pictures. This generation process time can be almost ignored.

Fourth Frame:

Wait until the fourth frame is captured, because the fourth frame has not been captured yet, and thereafter start to compress the fourth frame as a P-picture. This waiting time is a part of total waiting time.

Fifth Frame:

Continue the P-picture compression because the P-picture compression has not been completed yet although the B-picture compression should be started originally.

Sixth Frame:

Still continue P-picture compression because the P-picture compression has not been completed yet although B-picture compression should be started originally. Generate the code indicative of the frame with no difference after completion of the I-picture compression instead of compressing two B-pictures. This generation process time can be almost ignored.

Seventh Frame:

Wait until the seventh frame is captured, because the seventh frame has not been captured yet, and thereafter start to compress the seventh frame as a P-picture. This waiting time is a part of total waiting time.

The above compression processes are to be subsequently repeated in the same manner.

Thus, the compression can be performed in real time by deleting the compression process time for the B-picture though the compression process time for one frame is long because of the low compression performance.

The second, third, fifth, and sixth frames are treated as B-pictures in accordance with the operations shown in FIG. 8.

Figure 10:
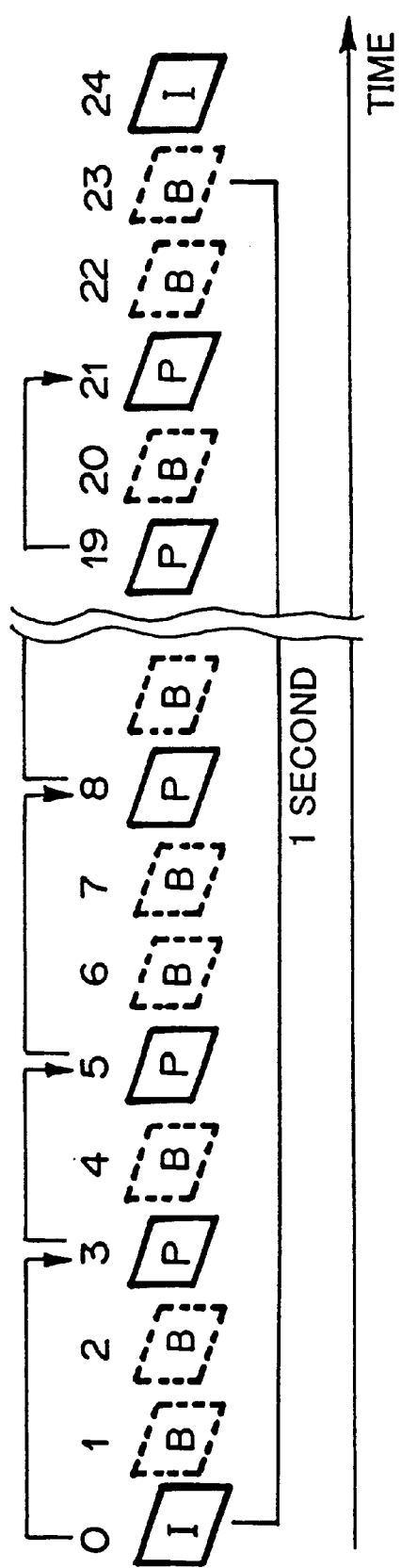
FIG. 10 is a diagram illustrating a GOP configuration according to the embodiment of the present invention.

FIG. 10 is a diagram illustrating a GOP configuration. The output frame rate is 24 [frame/sec] and the substantial frame rate is 9 [frame/sec] in an example of FIG. 10. I-pictures and P-pictures are definitely arranged so as to disperse uniformly using a value G represented by the following equation:

$$G=T[N \times R1/R2],$$

where

N: the number of frames compressed up to now;

R1: an output frame rate; and

R2: a substantial frame rate.

T [·] stands for rounding up, rounding down, or rounding.

Value G is a frame number of each of I-pictures or P-pictures. Value G is used as a frame number of an I-picture if it is a multiple of the output frame rate and as a frame number of a P-picture if it is not. Thus, an I-picture appears once a second.

There are several kinds of output frame rates of MPEG1, which include 23.976 [frame/sec], 24 [frame/sec], 25 [frame/sec], 29.97 [frame/sec], and 30 [frame/sec]. An output frame rate having the minimum L.C.M. with the substantial frame rate is preferably selected in order to increase the compression efficiency by decreasing the possible number of B-pictures. If the substantial frame rate is 2 [frame/sec], 3 [frame/sec], 4 [frame/sec], 6 [frame/sec], 8 [frame/sec], or 12 [frame/sec], 24 [frame/sec] is preferably selected as the output frame rate. If the substantial frame rate is 5 [frame/sec], 25 [frame/sec] is preferably selected as the output frame rate. In order to simplify the process, the output frame rate can also be fixed at 24 [frame/sec] that have the maximum number of divisors.

In the example of FIG. 10, in case of N=0, then G=0× 24/9=0. Thus, the 0th frame becomes an I-picture. In case of N=1, then G=1×24/9=2.666. Thus, by rounding, the 3rd frame becomes a P-picture. The 1st and 2nd frames therebetween become B-pictures. In case of N=2, then G=2× 24/9=5.33. Thus, by rounding, the 5th frame becomes a P-picture. The 4th frame therebetween becomes a B-picture. Similar computation is repeated subsequently to determine picture types.

FIG. 11 shows an example of a code sequence of the B-picture having no differential data. In FIG. 11, acronyms in the leftmost column represent code types, the number of bits at right side of each acronym represents the number of bits of code, and a numeral at right side of each number of the bits represent a value of the code. A Value having a suffix of (H) is denoted in hexadecimal. A Value having a suffix of (D) is denoted in decimal. A Value having no suffix is denoted in binary. The code sequence of the B-picture starts with PSC (Picture Start Code) indicative of its head. PCT (Picture Coding Type) subsequent to code TR has a value of 011(B) indicating that the current frame is the B-picture. Compressed data is described on a macro-block basis. MBAI (Macro Block Address Increment) indicates an increment from the previous macro block and the first MBAI has a value of 1. MBTYPE (Macro Block Type) subsequent to MBAI describes a format of a macro-block. If a value of MBP that is contained in MBTYPE is equal to 0, it indicates that no data to be coded is present in the macro-block. The value of 0010 of MBTYPE is of a variable length code originating from values of five elements contained in MBTYPE shown in FIG. 11. MB ESC (Macro Block Escape) subsequent to MBAI through MVF indicates that no coded data are present in 33 macro-blocks. This code is described twice, indicating that no coded data are present in 66 macro-blocks. Next MBAI has a value of 13, indicating that no coded data are present in further 12 macro-blocks. A value of 0 of MBP contained in MBYTE subsequent to MBAI also indicates that no coded data is present in a 13th macro-block following to 12 skipped macro-blocks. Thus, the number of macro-blocks that are not coded is equal to 1÷2×33+13=80. Therefore, the code sequence of FIG. 11 indicates that all macro-blocks in the frame are not coded because the frame herein exemplified consists of 80 macro-blocks. The number of bits contained in the code sequence of the B-picture is equal to 2×1+135=157 bits including two MB ESCs along with the bits of the codes sandwiching the both.

The code indicative of the frame with no difference and with a any picture size can be generated by increasing and decreasing the number of MB ESCs which is obtained from the following equation:

The number of MB ESCs=$(MB-MB1-MB2)/MB3$ where
MB: the number of macro-blocks in one frame;
MB1: the number of macro-blocks indicated by the first MBAI through MVF, which is one;
MB2: the maximum number of macro-blocks indicated by the last MBAI through MVF, which is 33; and
MB3: the number of macro-blocks indicated by one MB ESC, which is 33.

The last MBAI has different codes dependently on the number of macro-blocks to skip, and has the maximum number of bits equal to 11. Thus, the maximum number of bits excluding MB ESCs is equal to 142.

The process for generating the code indicative of the frame with no difference is very simple as explained above, and the load thereof is so low as it can be ignored as compared with the practical compression process.

As explained above, the moving picture coding apparatus can perform compression adaptively to the compression performance ability thereof according to the present invention. Because it is possible to adjust the substantial frame rate in conformity with the frame rate at which the moving picture coding apparatus can perform compression in real time by generating the code indicating that B-pictures have no differential data.

According to the present invention, the moving picture coding apparatus can adjust the substantial frame rate adaptively to the compression performance ability thereof even if the compressive performance ability varies during the operation. Because it is possible to change dynamically a ratio of the code indicating that a B-picture has no differential data by re-computing the ratio using the total time waiting for capture, the number of B-pictures which were interporated and the like.

Although the present invention has been shown and explained with respect to the preferred mode embodiments thereof, it should be understood by those skilled in the art that the forgoing and various other changes, omissions, and additions in the form and detail thereof may be made therein without departing from the spirit and scope of the present invention.

What is claimed is:

1. An apparatus for coding a moving picture by coding video frames of the moving picture into intra-frames (I-pictures), video frames sandwiched between contiguous intra-frames into forward predictive frames (P-pictures), and video frames sandwiched between a forward predictive frame and another forward predictive frame or an intra-frame into a bidirectionally predictive frames (B-pictures), comprising:

a frame decision unit that determines a number of B-pictures between a P-picture and another P-picture or an I-picture based on an output frame rate and a substantial frame rate which is defined as a number of pictures capable of being processed per unit time by said apparatus provided that only I-pictures and P-pictures are coded;

a coding device that codes said B-pictures by treating said B-pictures as frames with no differential data; and a means for selecting the output frame rate from a plurality of predetermined output frame rates so as to minimize the least common multiple between said substantial frame rate and the output frame rate.

2. An apparatus for coding a moving picture as recited in claim 1 wherein said coding device generates for each of said B-pictures a code sequence determined on the basis of a frame size of said moving picture.

3. An apparatus for coding a moving picture as recited in claim 1 wherein said frame decision unit determines said number of B-pictures so that said apparatus operates at a maximum performance ability.

4. The apparatus for coding a moving picture according to claim 1 wherein said frame decision unit determines said number of said B-pictures so that said number of said B-pictures are distributed in a substantially uniform manner.

5. An apparatus for coding a moving picture by coding video frames of the moving picture into intra-frames (I-pictures), video frames sandwiched between contiguous intra-frames into forward predictive frames (P-pictures), and video frames sandwiched between a forward predictive frame and another forward predictive frame or an intra-frame into a bidirectionally predictive frames (B-pictures), comprising:
- a frame decision unit that determines a number of B-pictures between a P-picture and another P-picture or an I-picture based on an output frame rate and a substantial frame rate which is defined as a number of pictures capable of being processed per unit time by said apparatus provided that only I-pictures and P-pictures are coded;
- a coding device that codes said B-pictures by treating said B-pictures as frames with no differential data; and
- a means for computing and updating said substantial frame rate based on a number of frames compressed since a most recent updating of said substantial frame rate, a current output frame rate, a number of said B-pictures interpolated since the most recent updating of said substantial frame rate, and a total time waiting for capture of I-pictures and P-pictures since the most recent updating of said substantial frame rate.

6. An apparatus for coding a moving picture as recited in claim 5 wherein said coding device generates for each of said B-pictures a code sequence determined on the basis of a frame size of said moving picture.

7. An apparatus for coding a moving picture as recited in claim 5 wherein said frame decision unit determines said number of B-pictures so that said apparatus operates at a maximum performance ability.

8. The apparatus for coding a moving picture according to claim 5, wherein said frame decision unit determines said number of said B-pictures so that said number of said B-pictures are distributed in a substantially uniform manner.

9. A method for coding a moving picture while coding video frames of the moving picture into intra-frames (I-pictures), video frames sandwiched between contiguous intra-frames into forward predictive frames (P-pictures), and frames sandwiched between a forward predictive frame and another forward predictive frame or an intra-frame into a bidirectionally predictive frames (B-pictures), comprising:
- determining a number of B-pictures between a P-picture and another P-picture or an I-picture based on an output frame rate and a substantial frame rate which is defined as a number of pictures capable of being processed per unit time by an apparatus employing said method provided that only I-pictures and P-pictures are coded;
- coding said B-pictures by treating said B-pictures as frames with no differential data; and
- selecting the output frame rate from a plurality of predetermined output frame rates so as to minimize a least common multiple between said substantial frame rate and the output frame rate.

10. A method for coding a moving picture according to claim 9 wherein, a code sequence determined based on a frame size of said moving picture is generated for each of said B-pictures.

11. The method for coding a moving picture according to claim 9, wherein said number of B-pictures is determined so that said apparatus operates at a maximum performance ability.

12. The method for coding a moving picture according to claim 9, wherein said number of B-pictures is determined so that said number of B-pictures are distributed in a substantially uniform manner.

13. A method for coding a moving picture while coding video frames of the moving picture into intra-frames (I-pictures), video frames sandwiched between contiguous intra-frames into forward predictive frames (P-pictures), and frames sandwiched between a forward predictive frame and another forward predictive frame or an intra-frame into a bidirectionally predictive frames (B-pictures), comprising:
- determining a number of B-pictures between a P-picture and another P-picture or an I-picture based on an output frame rate and a substantial frame rate which is defined as a number of pictures capable of being processed per unit time by an apparatus employing said method provided that only I-pictures and P-pictures are coded;
- coding said B-pictures by treating said B-pictures as frames with no differential data; and
- computing and updating said substantial frame rate based on a number of frames compressed since a most recent updating of said substantial frame rate, a current output frame rate, a number of said B-pictures interpolated since the most recent updating of said substantial frame rate, and a total time waiting for capture of I-pictures and P-pictures since the most recent updating of said substantial frame rate.

14. A method for coding a moving picture according to claim 13 wherein, a code sequence determined based on a frame size of said moving picture is generated for each of said B-pictures.

15. The method for coding a moving picture according to claim 13, wherein said number of B-pictures is determined so that said apparatus operates at a maximum performance ability.

16. The method for coding a moving picture according to claim 13, wherein said number of B-pictures is determined so that said number of B-pictures are distributed in a substantially uniform manner.

* * * * *